(12) United States Patent
Inokami

(10) Patent No.: US 12,711,479 B2
(45) **Date of Patent: *Aug. 18, 2026**

(54) CASH HANDLING SYSTEM AND CASH HANDLING METHOD

(71) Applicant: Glory Ltd., Himeji (JP)

(72) Inventor: Daisuke Inokami, Himeji (JP)

(73) Assignee: GLORY LTD., Himeji (JP)

( * ) Notice: Subject to any disclaimer, the term of this patent is extended or adjusted under 35 U.S.C. 154(b) by 295 days.

This patent is subject to a terminal disclaimer.

(21) Appl. No.: 18/197,734

(22) Filed: May 16, 2023

(65) Prior Publication Data

US 2023/0281589 A1 Sep. 7, 2023

Related U.S. Application Data

(63) Continuation of application No. 17/144,161, filed on Jan. 8, 2021, now Pat. No. 11,694,177, which is a (Continued)

(30) Foreign Application Priority Data

Jul. 17, 2018 (JP) ................................ 2018-133922

(51) Int. Cl.
*G06Q 20/20* (2012.01)
*G06Q 20/08* (2012.01)
(Continued)

(52) U.S. Cl.
CPC ......... *G06Q 20/204* (2013.01); *G06Q 20/085* (2013.01); *G06Q 20/1085* (2013.01); (Continued)

(58) Field of Classification Search
CPC ............... G06Q 20/204; G06Q 20/085; G06Q 20/1085; G06Q 20/065; G06Q 20/20; (Continued)

(56) References Cited

U.S. PATENT DOCUMENTS 5,945,652 A * 8/1999 Ohki ..................... G07F 7/0866 235/380
5,952,639 A * 9/1999 Ohki ..................... G07F 19/203 235/382

(Continued)

FOREIGN PATENT DOCUMENTS

CA 2192016 A * 6/1997
CA 2192016 A1 6/1997

(Continued)

OTHER PUBLICATIONS

Office Action issued Jun. 4, 2024 in corresponding European patent Application No. 19838692.2 (8 pages).

(Continued)

*Primary Examiner* — Ashford S Hayles
(74) *Attorney, Agent, or Firm* — XSENSUS LLP

(57) ABSTRACT

In order to improve efficiency of an operation of a cash handling system and reduce the labor required for the operation, a POS register receives an input of a cash-out amount, and an input of a charge amount. The POS register reads a debit card ID from a debit card, and transmits a settlement request including the debit card ID and a settlement amount to a management server. Upon receiving the settlement request, the management server withdraws the settlement amount from an account, and transmits a settlement permission to the POS register. Upon receiving the settlement permission from the management server, the POS register performs charge of electronic money, and transmits a dispensing instruction for the cash-out amount to a change machine. The change machine receives the dispensing instruction and dispenses cash.

16 Claims, 12 Drawing Sheets

Related U.S. Application Data continuation of application No. PCT/JP2019/027979, filed on Jul. 16, 2019.

(51) Int. Cl.

*G06Q 20/10* (2012.01)
*G06Q 40/02* (2023.01)
*G07D 11/14* (2019.01)
*G07D 11/16* (2019.01)
*G07F 19/00* (2006.01)
*G07D 1/06* (2006.01)

(52) U.S. Cl.

CPC ............. *G06Q 40/02* (2013.01); *G07D 11/14* (2019.01); *G07D 11/16* (2019.01); *G07F 19/203* (2013.01); *G07D 1/06* (2013.01); *G07D 2201/00* (2013.01); *G07D 2211/00* (2013.01)

(58) Field of Classification Search

CPC ............... G06Q 20/202; G06Q 20/227; G06Q 20/3672; G07F 19/203; G07D 1/06; G07D 2211/00; G07G 1/0009

See application file for complete search history.

(56) References Cited

U.S. PATENT DOCUMENTS

| | | | | |
|---|---|---|---|---|
| 6,728,686 | B2 * | 4/2004 | Kasai | G06Q 20/105 705/40 |
| 6,827,260 | B2 * | 12/2004 | Stoutenburg | G06Q 20/20 705/16 |
| 6,876,971 | B1 * | 4/2005 | Burke | G06Q 20/04 705/14.1 |
| 7,413,116 | B2 * | 8/2008 | Kogure | G07F 19/206 235/379 |
| 8,042,732 | B2 * | 10/2011 | Blake | G07D 9/008 235/375 |
| 9,916,567 | B1 * | 3/2018 | Baar | G06Q 20/30 |
| 10,296,895 | B2 * | 5/2019 | Llach | G06Q 20/349 |
| 11,610,191 | B1 * | 3/2023 | Janiga | G06Q 20/3223 |
| 2001/0011249 | A1 * | 8/2001 | Yanagihara | G06Q 20/108 705/40 |
| 2002/0030101 | A1 * | 3/2002 | Inoue | G07F 5/24 235/381 |
| 2002/0153414 | A1 * | 10/2002 | Stoutenburg | G06Q 20/04 235/380 |
| 2003/0033251 | A1 * | 2/2003 | Sherlock | G06Q 20/407 705/43 |
| 2003/0040927 | A1 * | 2/2003 | Sato | G06Q 20/20 705/1.1 |
| 2003/0046231 | A1 * | 3/2003 | Wu | G06Q 20/04 705/43 |
| 2004/0024700 | A1 * | 2/2004 | Petigny | G06Q 20/108 705/42 |
| 2004/0249718 | A1 * | 12/2004 | Kuroda | G07F 5/24 705/17 |
| 2005/0080737 | A1 * | 4/2005 | Stein | G06Q 40/00 705/42 |
| 2005/0256801 | A1 * | 11/2005 | Bucci | G07F 7/08 705/42 |
| 2006/0068897 | A1 * | 3/2006 | Sanford | G07F 17/3248 463/25 |
| 2006/0069642 | A1 * | 3/2006 | Doran | G06Q 20/108 705/39 |
| 2006/0080247 | A1 * | 4/2006 | Keohane | G06Q 40/02 705/42 |
| 2007/0011089 | A1 * | 1/2007 | DeSchryver | G06Q 20/04 705/35 |
| 2009/0063339 | A1 * | 3/2009 | Santora | G07F 19/20 705/41 |
| 2010/0262540 | A1 * | 10/2010 | Shin | G06Q 20/40 705/42 |
| 2011/0250950 | A1 * | 10/2011 | Nonaka | G06Q 20/20 463/25 |
| 2011/0276420 | A1 * | 11/2011 | White | G06Q 30/06 705/17 |
| 2012/0074217 | A1 * | 3/2012 | Block | G06Q 20/327 235/379 |
| 2012/0136779 | A1 * | 5/2012 | Nonaka | G06Q 20/341 705/39 |
| 2012/0239474 | A1 * | 9/2012 | Healy | G06Q 40/02 705/41 |
| 2012/0287157 | A1 * | 11/2012 | Doi | G07D 11/0087 358/1.18 |
| 2012/0290417 | A1 * | 11/2012 | Luevane | G07G 1/12 705/16 |
| 2013/0346306 | A1 * | 12/2013 | Kopp | G06Q 20/34 705/41 |
| 2016/0012465 | A1 * | 1/2016 | Sharp | G06Q 20/321 705/14.17 |
| 2016/0200526 | A1 * | 7/2016 | Tagashira | B65G 51/04 705/16 |
| 2016/0232506 | A1 * | 8/2016 | Gotanda | G06Q 20/047 |
| 2016/0328692 | A1 * | 11/2016 | Camps | G06Q 20/3223 |
| 2017/0076259 | A1 * | 3/2017 | Miyakawa | G06Q 20/20 |
| 2017/0256142 | A1 | 9/2017 | Oe et al. | |
| 2018/0033229 | A1 * | 2/2018 | Arai | G07D 11/30 |
| 2018/0165666 | A1 * | 6/2018 | Inoue | G06Q 20/20 |
| 2018/0165911 | A1 * | 6/2018 | Gotanda | G07F 9/04 |
| 2018/0218349 | A1 * | 8/2018 | Gotanda | G07F 5/22 |
| 2019/0066429 | A1 * | 2/2019 | Okuma | G07D 11/34 |
| 2020/0028876 | A1 | 1/2020 | Cohen et al. | |
| 2020/0143351 | A1 * | 5/2020 | Hirao | G06F 3/04847 |
| 2020/0231150 | A1 | 7/2020 | Takahashi | |
| 2020/0320114 | A1 | 10/2020 | Sparrow | |
| 2022/0012973 | A1 * | 1/2022 | Shimakata | G07D 11/18 |

FOREIGN PATENT DOCUMENTS

| | | | | | |
|---|---|---|---|---|---|
| CA | 2283513 | A1 | * | 3/2001 | G06Q 20/341 |
| CA | 2478343 | C | * | 2/2012 | |
| EP | 797174 | A2 | | 9/1997 | |
| EP | 854460 | A2 | * | 7/1998 | |
| EP | 3144906 | A1 | | 3/2017 | |
| FR | 2905783 | A1 | * | 3/2008 | G06Q 40/02 |
| JP | 797174 | A2 | * | 9/1997 | |
| JP | 10307951 | A | * | 11/1998 | |
| JP | 10340387 | A | * | 12/1998 | |
| JP | 2000200320 | A | * | 7/2000 | |
| JP | 2000215258 | A | * | 8/2000 | |
| JP | 2002083237 | A | * | 3/2002 | |
| JP | 2002352174 | A | * | 12/2002 | |
| JP | 2004213124 | A | * | 7/2004 | G06Q 40/00 |
| JP | 3686740 | B2 | * | 8/2005 | |
| JP | 2007241760 | A | * | 9/2007 | |
| JP | 2008-46919 | A | | 2/2008 | |
| JP | 2008046919 | A | * | 2/2008 | |
| JP | 2008-77481 | A | | 4/2008 | |
| JP | 4210688 | B2 | | 1/2009 | |
| JP | 4399883 | B2 | * | 1/2010 | |
| JP | 2010044711 | A | * | 2/2010 | |
| JP | 5848107 | B2 | * | 1/2016 | |
| JP | 2016157391 | A | * | 9/2016 | |
| JP | 2018028871 | A | * | 2/2018 | |
| JP | 2018101430 | A | * | 6/2018 | |
| KR | 20170107378 | A | * | 9/2017 | G06Q 20/14 |
| KR | 20170129648 | A | * | 11/2017 | G06Q 50/01 |
| KR | 20190002409 | A | * | 1/2019 | G06Q 40/02 |
| OA | 17553 | A | * | 2/2017 | |
| WO | WO-0103079 | A1 | * | 1/2001 | G06Q 20/4093 |
| WO | WO-2007044925 | A2 | * | 4/2007 | G06Q 40/02 |
| WO | WO-2009129568 | A1 | * | 10/2009 | G06Q 20/3572 |
| WO | WO-2016043658 | A1 | * | 3/2016 | G06Q 20/342 |
| WO | WO-2018207574 | A1 | * | 11/2018 | G06Q 20/209 |

OTHER PUBLICATIONS

International Search Report and Written Opinion mailed on Aug. 20,

(56) References Cited

OTHER PUBLICATIONS 2019, received for PCT Application No. PCT/JP2019/027979, filed on Jul. 16, 2019, 8 Pages.
Extended European search report issued on Mar. 29, 2022, in corresponding European patent Application No. 19838692.2, 8 pages.
J.N. Luo and M.H. Yang, "Offline Transferable E-Cash Mechanism," 2018 IEEE Conference on Dependable and Secure Computing (DSC), Kaohsiung, Taiwan, 2018, pp. 1-2, doi: 10.1109/DESEC.2018.8625136. (Year: 2018).

* cited by examiner

FIG.4

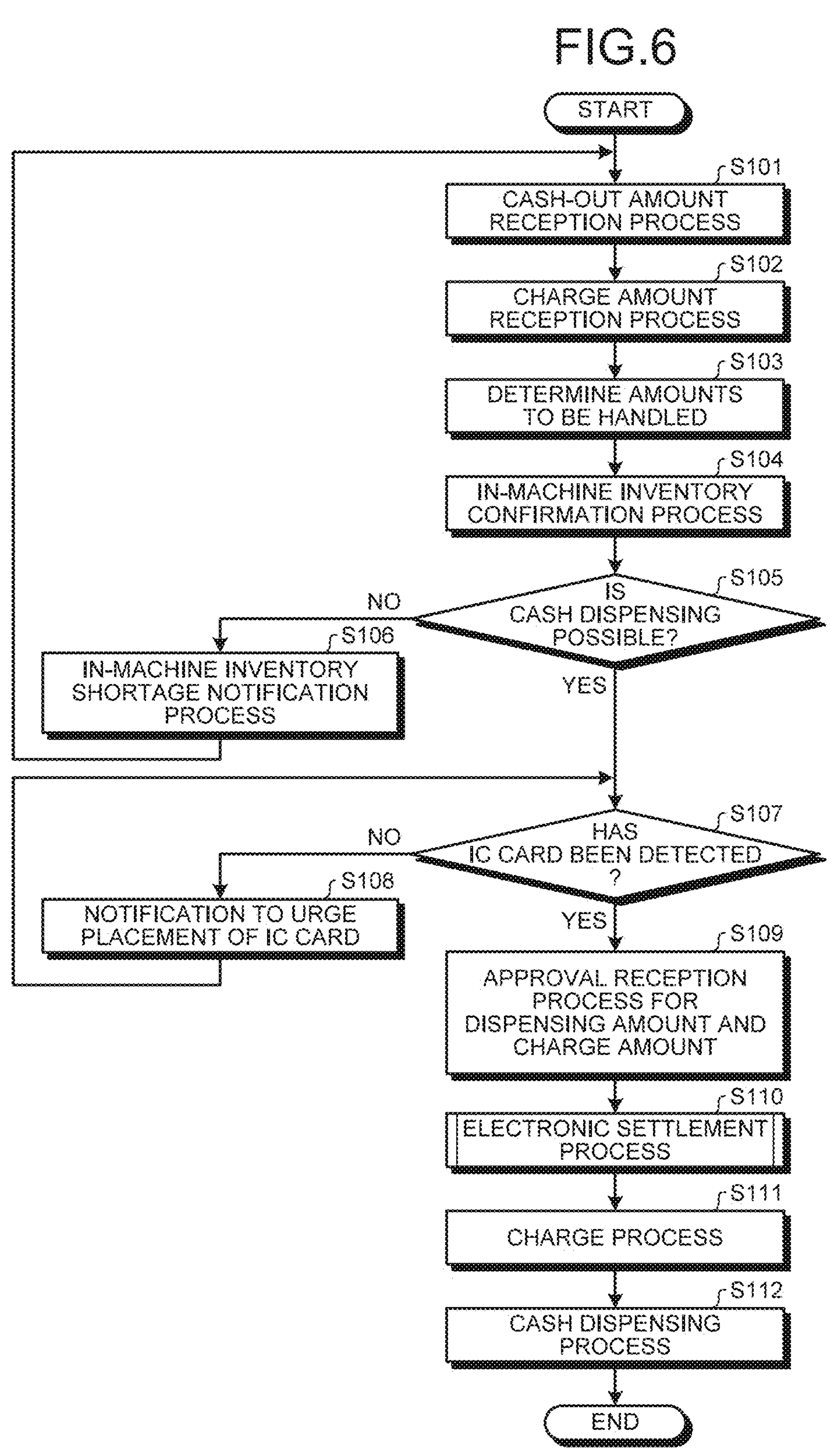
FIG.6
START
S101
CASH-OUT AMOUNT RECEPTION PROCESS
S102
CHARGE AMOUNT RECEPTION PROCESS
S103
DETERMINE AMOUNTS TO BE HANDLED
S104
IN-MACHINE INVENTORY CONFIRMATION PROCESS
S105
IS CASH DISPENSING POSSIBLE?
NO
S106
IN-MACHINE INVENTORY SHORTAGE NOTIFICATION PROCESS
YES
S107
HAS IC CARD BEEN DETECTED ?
NO
S108
NOTIFICATION TO URGE PLACEMENT OF IC CARD
YES
S109
APPROVAL RECEPTION PROCESS FOR DISPENSING AMOUNT AND CHARGE AMOUNT
S110
ELECTRONIC SETTLEMENT PROCESS
S111
CHARGE PROCESS
S112
CASH DISPENSING PROCESS
END

FIG.9

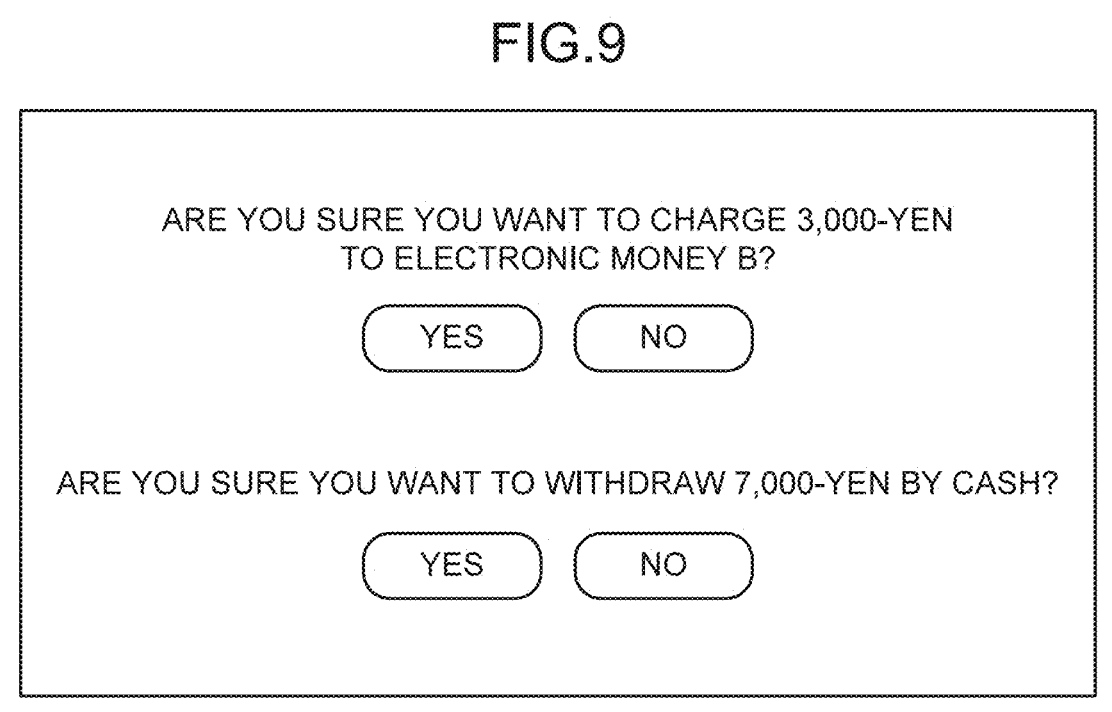

ARE YOU SURE YOU WANT TO CHARGE 3,000-YEN TO ELECTRONIC MONEY B?

YES NO

ARE YOU SURE YOU WANT TO WITHDRAW 7,000-YEN BY CASH?

YES NO

FIG.10

| FIRST AMOUNT AND SECOND AMOUNT | HANDLING AMOUNT |
|---|---|
| SETTLEMENT AMOUNT - ACQUIRED<br>CHARGE AMOUNT - ACQUIRED | SETTLEMENT AMOUNT = ACQUIRED AMOUNT (+ FEE)<br>CHARGE AMOUNT = ACQUIRED AMOUNT<br>CASH-OUT AMOUNT = SETTLEMENT AMOUNT – CHARGE AMOUNT |
| CHARGE AMOUNT - ACQUIRED<br>CASH-OUT AMOUNT - ACQUIRED | SETTLEMENT AMOUNT = CHARGE AMOUNT + CASH-OUT AMOUNT (+FEE)<br>CHARGE AMOUNT = ACQUIRED AMOUNT<br>CASH-OUT AMOUNT = ACQUIRED AMOUNT |
| SETTLEMENT AMOUNT - ACQUIRED<br>CASH-OUT AMOUNT - ACQUIRED | SETTLEMENT AMOUNT = ACQUIRED AMOUNT (+ FEE)<br>CHARGE AMOUNT = SETTLEMENT AMOUNT – CASH-OUT AMOUNT<br>CASH-OUT AMOUNT = ACQUIRED AMOUNT |

CASH HANDLING SYSTEM AND CASH HANDLING METHOD

CROSS-REFERENCE TO RELATED APPLICATIONS

The present application is a continuation of Ser. No. 17/144,161, filed Jan. 8, 2021, which is a continuation of, and claims priority to, International application PCT/JP2019/027979, filed Jul. 16, 2019, which claims priority to JP 2018-133922, filed Jul. 17, 2018, the entire contents of each being incorporated herein by reference.

TECHNICAL FIELD

The present disclosure relates to a cash handling system and a cash handling method for dispensing cash for electronic settlement.

BACKGROUND ART

Conventionally, cash handling systems for performing processes on cash have been installed in various stores such as convenience stores and supermarkets. In many cash handling systems, a cash register having a point-of-sales management function (hereinafter referred to as "POS register") and a money handling apparatus (hereinafter referred to as "change machine") are communicably connected to each other. For example, a store clerk scans a barcode attached to an item with a barcode reader of the POS register to specify the price of the item. When the clerk inserts money received from a customer into the change machine, change is dispensed from the change machine.

When the cash handling system can accept electronic settlement, settlement for the price of the item may be performed by the electronic settlement. Examples of the electronic settlement include debit settlement, credit settlement, and electronic money settlement.

In addition to settlement for purchasing items, a POS register and a change machine may be used for other purposes. For example, Japanese Patent No. 4210688 discloses a cash-out handling system capable of dispensing, for a customer, cash that has been withdrawn from a bank account of the customer by using a debit card of the customer. In this cash-out handling system, a customer comes to a checkout counter with an item that the customer purchases and a tag prepared for cash-out. The amount of cash the customer desires is read from the tag. Cash corresponding to a difference between the amount read from the tag and the price of the item purchased by the customer is dispensed from a cash settlement terminal.

SUMMARY

In the conventional art, however, operation of the cash handling system is likely to be complicated. For example, if the customer desires to add (charge), to electronic money, a part of the cash dispensed by the cash-out, the customer needs to perform an operation for the charge of electronic money after performing the operation for the cash-out.

Specifically, in the cash handling system operated by the clerk, after the customer received the cash dispensed by the cash-out, the customer passes to the clerk an IC (Integrated Circuit) card linked with electronic money, and cash whose amount is greater than an amount for the charge of the electronic money. Then, the clerk operates the POS register to charge the IC card with the amount of the cash the customer desires to charge. That is, two operations, i.e., the operation for the cash-out and the operation for the charge of the IC card, are required. A similar problem will occur when the customer operates the cash handling system by himself/herself, and the customer needs to perform an operation for dispensing cash and an operation for charging the IC card.

Therefore, it is an important issue to improve efficiency of the operation of the cash handling system and reduce the labor for the operation.

The present disclosure is made in view of the problems of the conventional art. The present disclosure addresses issues, as discussed herein, with a cash handling system capable of dealing with electronic money, including: processing circuitry configured to deal with, as electronic money, a part of money to be transferred to the electronic money, the money being withdrawn from an account, and a dispenser configured to dispense cash that is a part of the money.

BRIEF DESCRIPTION OF THE DRAWINGS

FIG. 4 illustrates a configuration of a banknote handling unit.

FIG. 6 is a flowchart showing a procedure of handling when the POS register performs cash-out and charge.

FIG. 9 illustrates a specific example of an approval reception screen that displays a dispensing amount and a charge amount, and receives an approval operation performed by a customer.

FIG. 10 illustrates determination of monetary amounts by an amount-to-be-handled control unit.

DETAILED DESCRIPTION

Hereinafter, examples of a cash handling system and a cash handling method according to the present embodiment will be described with reference to the accompanying drawings. In this embodiment, the present disclosure is applied to a cash handling system installed in a store such as a convenience store or a supermarket.

<Concept of Cash Handling System According to Present Embodiment>

Figure 1:
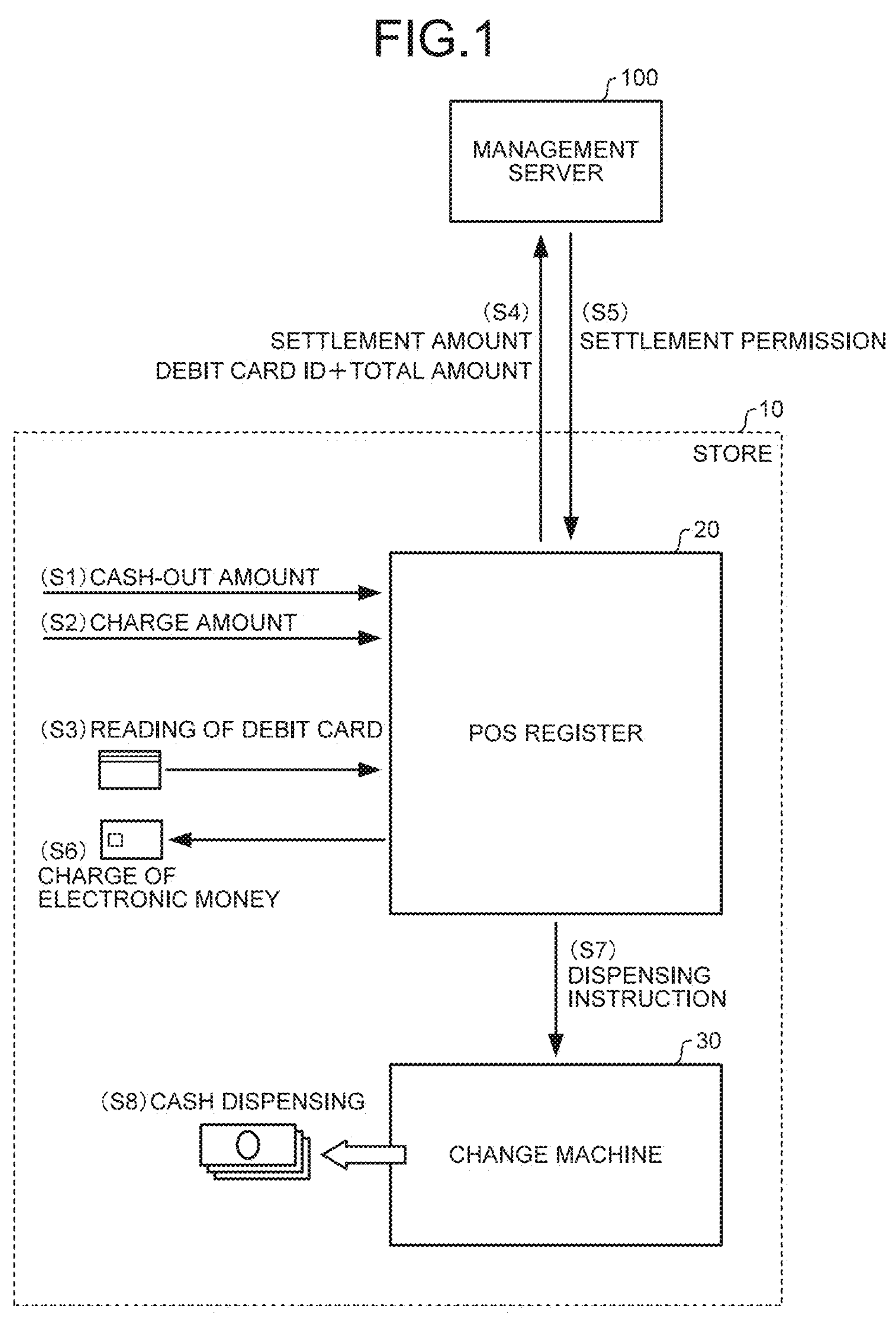
FIG. 1 illustrates a concept of a cash handling system according to an embodiment of the present disclosure.
Figure 12:
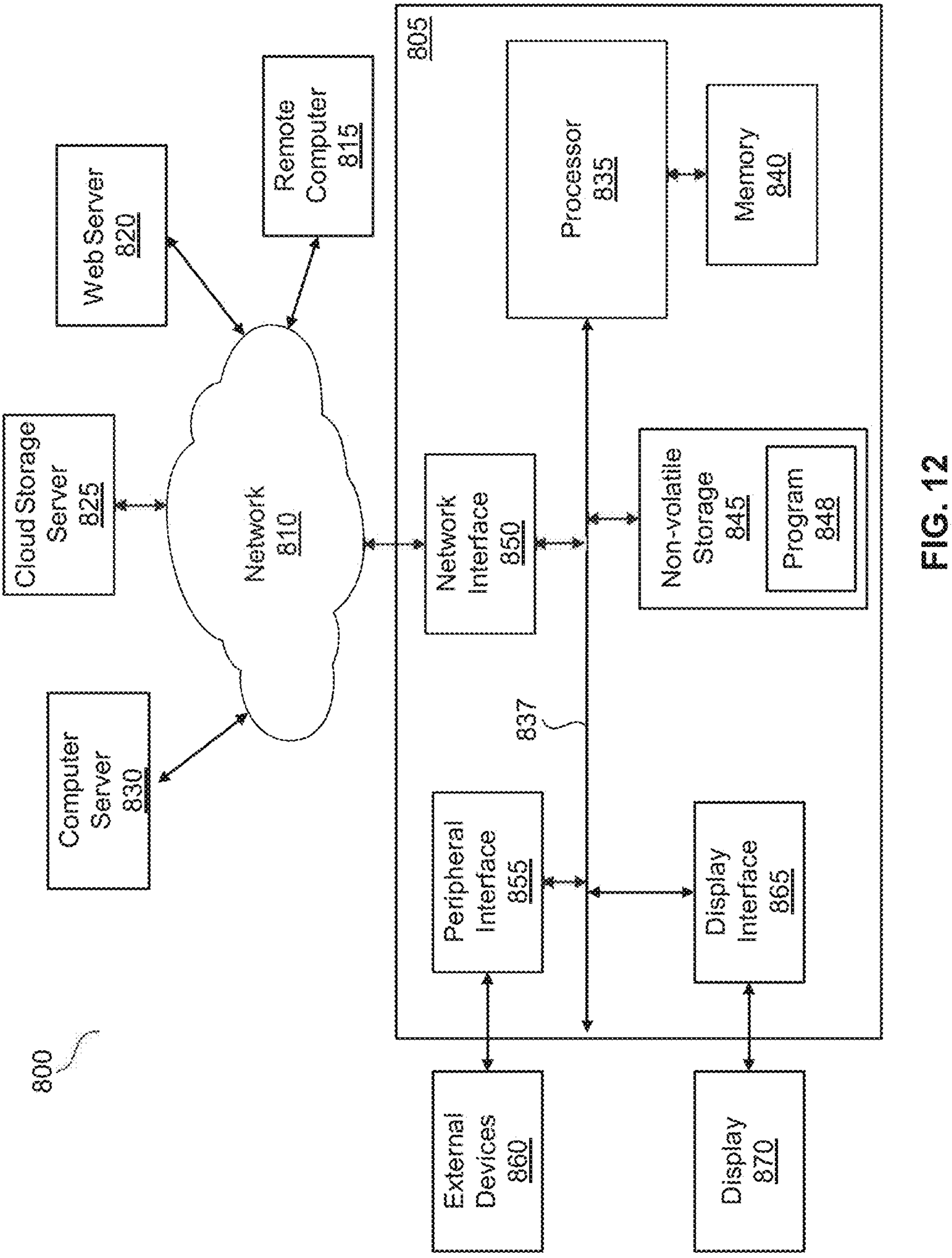
FIG. 12 is a block diagram of computer-based circuitry that may be used to implement control features of the present disclosure.

FIG. 1 illustrates a concept of a cash handling system according to the present embodiment. The cash handling system is used in a store 10 such as a convenience store or a supermarket. The cash handling system has a configuration in which a POS register 20 is connected to a change machine 30. The POS register 20 is a cash register having a point-of-sales management function. The change machine 30 receives cash from a customer and dispenses change according to the received cash, and stores the received cash therein. Note that each of the components illustrated in FIG. 1 may be configured as a computing device as depicted in FIG. 12.

The POS register 20 performs a transaction process when the customer purchase items. Specifically, the POS register 20 receives an input of data of items that the customer purchases, and calculates a purchase amount that is the total of the prices of the items. The change machine 30 receives money that the clerk has received from the customer, and transmits the total amount of the received money to the POS register 20. When the amount of the received money exceeds the purchase amount, the POS register 20 instructs the change machine 30 to dispense change and the change machine 30 dispenses the change.

The POS register 20 has a function as a debit terminal. The POS register 20 communicates with a management server 100 outside the store 10 to perform a process for debit settlement. The POS register 20 performs settlement by electronic money linked to an IC card, and addition (charge) of electronic money.

The "debit settlement" is a settlement that is performed by withdrawing a settlement amount from an account of a financial institution or the like by using a debit card linked to the account. When the customer purchases items, a purchase amount for these items is processed as the settlement amount.

The cash handling system according to the present embodiment can use debit settlement for dispensing cash, i.e., cash-out, as well as purchase of items.

In the cash handling system, when charge of electronic money is performed simultaneously with cash-out, debit settlement is performed with a settlement amount that is a total of a cash-out amount and a charge amount (transfer amount), so that dispensing of cash for the cash-out and charge of electronic money can be performed.

Specifically, the POS register 20 receives an input of a cash-out amount (S1), and receives an input of a charge amount (S2). The POS register 20 reads a debit card ID from a debit card presented by a customer as a user (S3), and transmits, to the management server 100, a settlement request including the debit card ID and the settlement amount (S4).

Upon receiving the settlement request from the POS register 20, the management server 100 determines whether or not withdrawal of the settlement amount from an account linked to the debit card ID is possible. When withdrawal of the settlement amount is possible, the management server 100 withdraws the settlement amount from the account and transmits a settlement permission to the POS register 20 (S5).

Upon receiving the settlement permission from the management server 100, the POS register 20 performs charge of electronic money and dispensing of cash. Charge of the electronic money is performed with an IC card, which is a charge destination, placed at a predetermined position of the POS register 20 (S6). The POS register 20 transmits, to the change machine 30, a dispensing instruction for the cash-out amount (S7). The change machine 30 dispenses cash based on the dispensing instruction (S8).

In the example shown in FIG. 1, a cash-out amount and a charge amount are directly inputted to the POS register 20, and the total of these amounts is obtained as a settlement amount. However, designation of amounts may be performed by any method. For example, in a case where a settlement amount and a charge amount are designated, a difference between these amounts is obtained as a cash-out amount. That is, when the POS register 20 acquires two amounts out of a cash-out amount, a charge amount, and a settlement amount, the POS register 20 can control the charge amount, which is a negotiable value, to be charged to an IC card, and the amount of cash to be dispensed from the change machine 30.

As described above, the cash handling system acquires a first amount and a second amount, and controls, based on the first amount and the second amount, a charge amount of electronic money to be charged to an IC card, and the amount of cash to be dispensed from the change machine 30. Therefore, efficient operations are achieved even when charge of electronic money is performed simultaneously with cash-out.

A store clerk who is an operator of the POS register 20 may input the first amount and the second amount. Alternatively, cards having codes (e.g., QR codes (registered trademark)) indicating different monetary amounts may be prepared near the POS register 20 or the like, and the clerk may perform an operation of reading a card selected by a customer.

Alternatively, a customer may perform an operation of inputting monetary amounts by using an operation/display unit prepared for a customer. Still alternatively, a cash-out amount may be designated through a card while a charge amount may be inputted through the operation/display unit by a customer. Thus, different input means may be used for each amount.

<Configuration of Apparatus>

Figure 2:
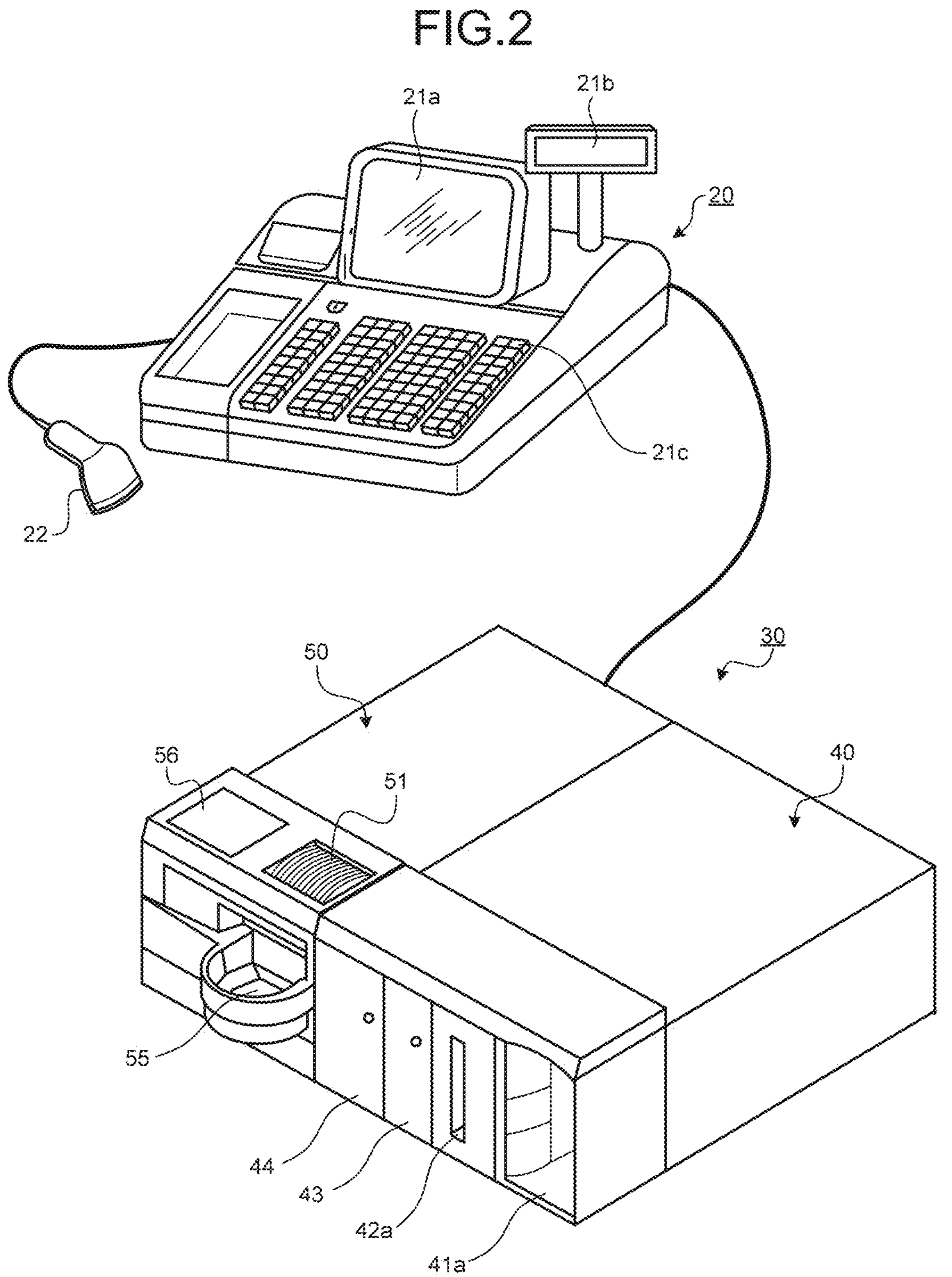
FIG. 2 illustrates external configurations of a POS register and a change machine.

The configurations of the respective apparatuses will be described. FIG. 2 shows the external configurations of the POS register 20 and the change machine 30. As shown in FIG. 2, the POS register 20 includes a display 21*a* for an operator, a display 21*b* for a customer, a barcode reader 22, and an operation unit 21*c* such as operation keys.

The change machine 30 includes a banknote handling unit 40, and a coin handling unit 50 which is disposed adjacent to the banknote handling unit 40. The POS register 20 can be disposed on the banknote handling unit 40 and the coin handling unit 50.

The banknote handling unit 40 performs depositing and dispensing of banknotes. The banknote handling unit 40 includes a banknote inlet 41*a* and a banknote outlet 42*a*. The banknote handling unit 40 further includes a dispensing reject unit 43 and a cassette mounting unit 44 which are described later.

The coin handling unit 50 performs depositing and dispensing of coins. The coin handling unit 50 includes a coin inlet 51 and a coin outlet 55. The coin handling unit 50 further includes an operation/display unit 56 of the change machine 30.

Figure 3:
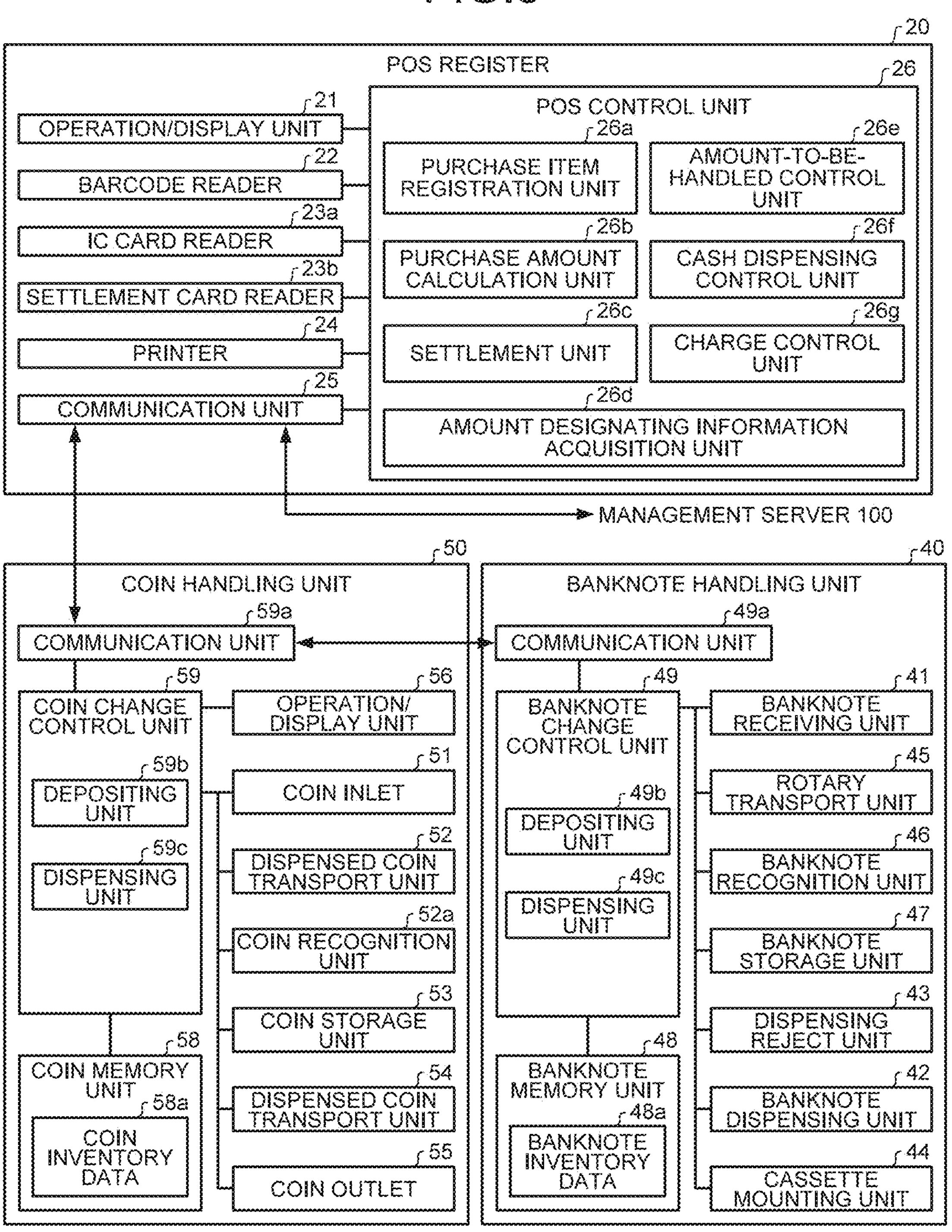
FIG. 3 is a functional block diagram showing functional configurations of the POS register and the change machine.

FIG. 3 is a functional block diagram showing the functional configurations of the POS register 20 and the change machine 30. As shown in FIG. 3, the POS register 20 includes an operation/display unit 21, the barcode reader 22, an IC card reader 23*a*, a settlement card reader 23*b*, a printer 24, a communication unit 25, and a POS control unit 26.

The operation/display unit 21 outputs information to an operator and a customer, and receives an input from the operator, through the display 21*a*, the display 21*b*, and the operation unit 21*c* shown in FIG. 2. The barcode reader 22 is a reading unit for reading information. The barcode reader 22 is used for reading a barcode attached to an item to acquire information such as the name, price, etc., of the item. The barcode reader 22 is also used for reading a card for cash-out that indicates an amount of cash to be dispensed. The IC card reader 23*a* has a structure such that an IC card can be placed thereon. The IC card reader 23*a* is used for settlement performed with electronic money linked to the placed IC card. The IC card reader 23*a* is also used for charge of electronic money linked to the placed IC card. The settlement card reader 23*b* is used for checkout with a payment card such as a credit card and a debit card.

The printer 24 is used for issuing a receipt on which the content of transaction is printed. The content of transaction to be printed on the receipt includes, for example, date and time, the name and price of a registered item, an amount of received money, and an amount of change. The communication unit 25 is a communication interface for communicating with the change machine 30, the management server 100, etc.

The POS control unit 26 controls the entirety of the POS register 20, and includes a purchase item registration unit 26*a*, a purchase amount calculation unit 26*b*, a settlement unit 26*c*, an amount designating information acquisition unit 26*d*, an amount-to-be-handled control unit 26*e*, a cash dispensing control unit 26*f*, and a charge control unit 26*g*. In actuality, programs corresponding to these functional units are stored in a ROM or a nonvolatile memory which are not shown, and these programs are loaded to a CPU (Central Processing Unit) and executed, thereby causing the CPU to perform processes corresponding to the purchase item registration unit 26*a*, the purchase amount calculation unit 26*b*, the settlement unit 26*c*, the amount designating information acquisition unit 26*d*, the amount-to-be-handled control unit 26*e*, the cash dispensing control unit 26*f*, and the charge control unit 26*g*.

The purchase item registration unit 26*a* performs registration of an item to be purchased. Specifically, when the barcode reader 22 reads a barcode attached to an item and acquires information such as the name and the price of the item, the purchase item registration unit 26*a* performs registration of the item based on the acquired information, and displays the information of the registered item on the display 21*a* or the like.

The purchase amount calculation unit 26*b* sums up the prices of all items registered by the purchase item registration unit 26*a* to calculate a purchase amount, and displays the purchase amount on the display 21*a* or the like.

After the purchase amount has been calculated by the purchase amount calculation unit 26*b*, the settlement unit 26*c* performs settlement of the purchase amount to complete the transaction, and issues a receipt. When settlement of the purchase amount is to be performed by cash, the settlement unit 26*c* transmits the purchase amount to the change machine 30, receives the total amount of money received by the change machine 30, and transmits, to the change machine 30, an instruction for dispensing money corresponding to change according to need, thereby completing the settlement.

Settlement of the purchase amount can also be performed by electronic settlement. For example, the settlement card reader 23*b* reads a debit card ID, and the settlement unit 26*c* receives identification data such as a PIN number. Then, the settlement unit 26*c* transmits a settlement request including a settlement amount that is the purchase amount, the debit card ID, and the identification data to the management server 100, thereby performing debit settlement.

Likewise, the settlement card reader 23*b* reads a credit card ID, and the settlement unit 26*c* receives identification data such as a PIN number. Then, with the purchase amount being a settlement amount, the settlement unit 26*c* transmits a settlement request including the credit card ID, the identification data, and the settlement amount to a predetermined server, thereby performing credit settlement. In a case where an IC card is placed on the IC card reader 23*a* and electronic money settlement is selected, the settlement unit 26*c* subtracts the purchase amount from the balance of electronic money linked to the IC card, thereby performing electronic money settlement.

The settlement unit 26*c* can also perform settlement for cash-out in addition to settlement for the purchase amount. When performing settlement for cash-out, the amount-to-be-handled control unit 26*e* determines a settlement amount as described later. For example, when performing cash-out by debit settlement, the settlement unit 26*c* serving as a transmission unit transmits, to the management server 100, a settlement request including the settlement amount determined by the amount-to-be-handled control unit 26*e*, a debit card ID, and identification data, thereby performing debit settlement.

The amount designating information acquisition unit 26*d* acquires information designating amounts for cash-out and charge. As for information designating the amounts for cash-out and charge, two amounts out of a cash-out amount, a charge amount, and a settlement amount may be acquired. For convenience sake, these two amounts are referred to as a first amount and a second amount.

A clerk who is an operator of the POS register 20 can input the first amount and the second amount by using the operation/display unit 21. Alternatively, cards having codes indicating different monetary amounts may be disposed near the POS register 20 or the like, and a card selected by a customer may be read by the barcode reader 22 to input the first amount and/or the second amount. Alternatively, a touch panel display or the like may be installed as an operation/display unit for a customer, and used by the customer to input the first amount and/or the second amount. Still alternatively, for example, a cash-out amount may be designated through a card while a charge amount may be inputted through the operation/display unit by a customer. The first amount and the second amount may be received by different input means.

The amount-to-be-handled control unit 26*e* is a determination unit for determining three amounts, i.e., a settlement amount, a cash-out amount, and a charge amount, based on the first amount and the second amount. The settlement amount, the cash-out amount, and the charge amount satisfy a formula: settlement amount=cash-out amount+charge amount. In a case where a fee is collected for cash-out, the relationship satisfies a formula: settlement amount=cash-out amount+charge amount+fee.

If the inventory amount of money in the change machine is running short, a situation where dispensing of money for the cash-out amount cannot be performed, may occur. Therefore, the amount-to-be-handled control unit 26*e* performs an in-machine inventory confirmation process of acquiring, from the change machine 30, information on the inventory amount of money stored in the change machine 30. The amount-to-be-handled control unit 26*e* determines, based on the acquired information, whether or not cash for the cash-out amount can be dispensed from the change machine 30.

When the determination result indicates that cash for the cash-out amount cannot be dispensed, the amount-to-be-handled control unit 26*e* notifies of the shortage of the inventory amount in the change machine 30 to request change of the amount.

As for the amount of money that cannot be dispensed from the change machine 30, this amount may be added to the charge amount. In this case, the cash-out amount and the charge amount are changed while the settlement amount remains unchanged, whereby the cash-out amount becomes within a dispensable range.

Alternatively, only cash for the dispensable amount may be dispensed from the change machine 30 without adding the remaining amount to the charge amount. In this case, the settlement amount and the cash-out amount are changed while the charge amount remains unchanged, whereby the cash-out amount becomes within a dispensable range.

When charge of electronic money is to be performed, the charge cannot be started unless an IC card to be a charge destination is placed on the IC card reader 23*a*. The amount-to-be-handled control unit 26*e* determines whether or not the IC card reader 23*a* has detected an IC card. When an IC card cannot be detected, the amount-to-be-handled control unit 26*e* performs notification for urging placement of an IC card. Alternatively, when an IC card cannot be detected, cash for the charge amount may be dispensed from the change machine 30. Specifically, a message such as "IC card is not detected. Do you want the charge amount to be dispensed by cash?" may be displayed for the customer, and an input for confirmation such as "Yes" and "No" may be received from the customer. Still alternatively, when an IC card cannot be detected, electronic settlement may be cancelled.

When money for the cash-out amount can be dispensed and an IC card to be a charge destination has been detected, the amount-to-be-handled control unit 26*e* performs an approval reception process to display the dispensing amount and the charge amount, and receive an approval operation of the customer. Upon receiving the approval operation, the amount-to-be-handled control unit 26*e* outputs the determined settlement amount to the settlement unit 26*c* to request settlement. When the settlement has been appropriately completed, the amount-to-be-handled control unit 26*e* outputs the cash-out amount to the cash dispensing control unit 26*f*, and outputs the charge amount to the charge control unit 26*g*.

Upon receiving the cash-out amount from the amount-to-be-handled control unit 26*e*, the cash dispensing control unit 26*f* transmits, to the change machine 30, an instruction for dispensing the cash-out amount, thereby controlling the cash dispensing process.

Upon receiving the charge amount from the amount-to-be-handled control unit 26*e*, the charge control unit 26*g* charges electronic money for the charge amount to the IC card through the IC card reader 23*a*, thereby controlling the charge process.

The change machine 30 includes the banknote handling unit 40 and the coin handling unit 50. The banknote handling unit 40 stores therein banknotes for each denomination, and the coin handling unit 50 stores therein coins for each denomination.

The banknote handling unit 40 includes a communication unit 49*a*, a banknote receiving unit 41, a rotary transport unit 45, a banknote recognition unit 46, a banknote storage unit 47, a dispensing reject unit 43, a banknote dispensing unit 42, a cassette mounting unit 44, a banknote memory unit 48, and a banknote change control unit 49. The communication unit 49*a* is an interface unit for data communication with the coin handling unit 50 via a communication line. The banknote handling unit 40 is not connected to the POS register 20 directly by a communication line, but can communicate with the POS register 20 via the coin handling unit 50.

The banknote memory unit 48 is a memory device implemented by, for example, a nonvolatile memory such as a flash memory, or a secondary storage medium such as a hard disk drive. The banknote memory unit 48 stores therein banknote inventory data 48*a*.

The banknote inventory data 48*a* indicates: a storage inventory number that is the number, for each denomination, of banknotes stored in the banknote handling unit 40; and a dispensable inventory number that is the number, for each denomination, of dispensable banknotes. For example, when abnormal transport of banknotes or the like occurs, these banknotes are included in the storage inventory number but are not included in the dispensable inventory number. Specifically, when the storage inventory number of 10,000-JPY notes is 100, if overlapping of banknotes occurs three times, the dispensable inventory number will be 94 (=100−2×3). A banknote that could not be recognized due to recognition failure, and a banknote that has been stored in an area from which the banknote cannot be fed out because of the capacity of a storage unit or the like being exceeded, are also not included in the dispensable inventory number.

The banknote change control unit 49 controls the banknote handling unit 40. The banknote change control unit 49 includes a depositing unit 49*b* and a dispensing unit 49*c*.

The depositing unit 49*b* performs depositing of banknotes. When a purchase amount is received from the POS register 20, the depositing unit 49*b* permits insertion of banknotes into the banknote handling unit 40.

Thereafter, the depositing unit 49*b* acquires the number of banknotes, for each denomination, inserted into the banknote handling unit 40, calculates the total amount of the inserted banknotes, and transmits the calculation result to the POS register 20 via the communication unit 49*a* of the coin handling unit 50.

The dispensing unit 49*c* performs dispensing of banknotes. Specifically, upon receiving a dispensing instruction from the POS register 20 via the communication unit 59*a* of the coin handling unit 50, the dispensing unit 49*c* determines denominations and the number for each denomination of banknotes to be dispensed, based on the amount indicated by the dispensing instruction, and dispenses banknotes. When the dispensing is successfully completed, the dispensing unit 49*c* notifies the POS register 20 of the completion via the communication unit 59*a* of the coin handling unit 50.

The coin handling unit 50 includes a communication unit 59*a*, a coin inlet 51, a deposited coin transport unit 52, a coin recognition unit 52*a*, a coin storage unit 53, a dispensed coin transport unit 54, a coin outlet 55, an operation/display unit 56, a coin memory unit 58, and a coin change control unit 59. The communication unit 59*a* is an interface unit for data communication with the POS register 20 and the banknote handling unit 40 via a communication line.

The coin memory unit 58 is a memory device implemented by, for example, a nonvolatile memory such as a flash memory, or a secondary storage medium such as a hard disk drive. The coin memory unit 58 stores therein coin inventory data 58*a*. The coin inventory data 58*a* indicates: a storage inventory number that is the number, for each denomination, of coins stored in the coin handling unit 50; and a dispensable inventory number that is the number, for each denomination, of dispensable coins. For example, when abnormal transport of coins or the like occurs, these coins are included in the storage inventory number but are not included in the dispensable inventory number.

The coin change control unit 59 controls the coin handling unit 50. The coin change control unit 59 includes a depositing unit 59*b* and a dispensing unit 59*c*.

The depositing unit 59*b* performs depositing of coins. When a purchase amount is received from the POS register 20, the depositing unit 59*b* permits insertion of coins into the coin handling unit 50.

Thereafter, the depositing unit 59*b* acquires the number of coins, for each denomination, inserted into the coin handling unit 50, calculates the total amount of the inserted coins, and transmits the calculation result to the POS register 20.

The dispensing unit 59*c* performs dispensing of coins. Specifically, upon receiving a dispensing instruction from the POS register 20, the dispensing unit 59*c* determines denominations and the number for each denomination of coins to be dispensed, based on the amount indicated by the dispensing instruction, and dispenses coins. When the dispensing is successfully completed, the dispensing unit 59*c* notifies the POS register 20 of the completion.

Figure 4:
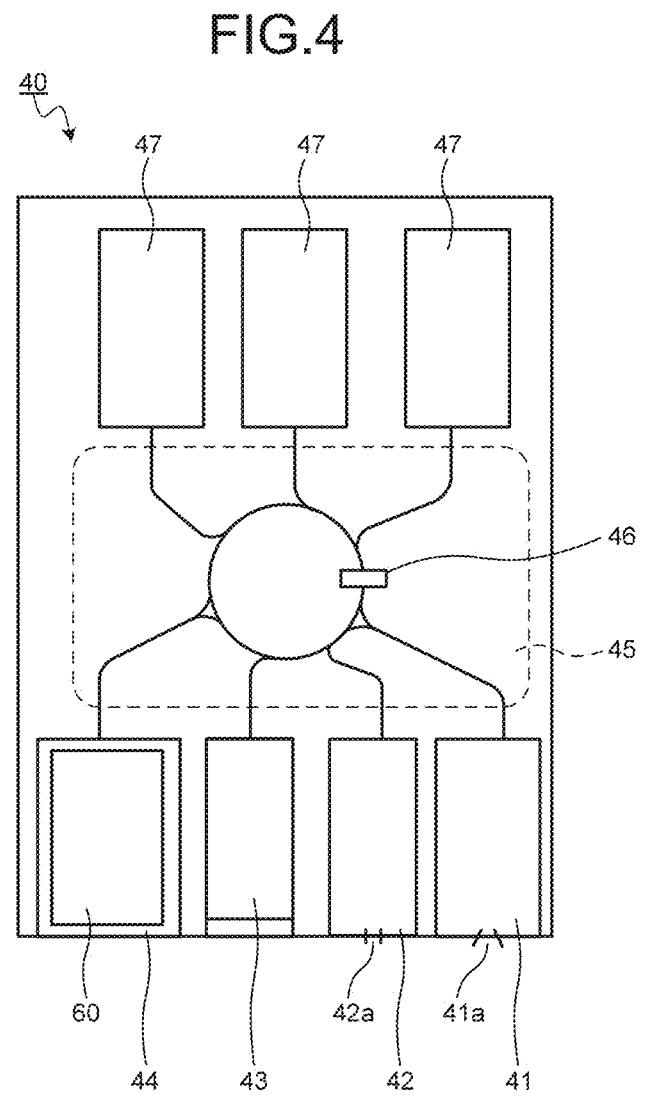

Next, the banknote handling unit 40 and the coin handling unit 50 are described in detail. FIG. 4 illustrates the configuration of the banknote handling unit 40. As shown in FIG. 4, the banknote handling unit 40 includes the banknote receiving unit 41, the banknote dispensing unit 42, the dispensing reject unit 43, the cassette mounting unit 44, the rotary transport unit 45, the banknote recognition unit 46, and denomination-specific banknote storage units 47.

The banknote receiving unit 41 receives banknotes inserted through the banknote inlet 41*a*, and feeds the banknotes one by one into the rotary transport unit 45. The banknote dispensing unit 42 temporarily stores therein the banknotes transported one by one from the rotary transport unit 45. When all the banknotes to be dispensed have been stored, the banknote dispensing unit 42 discharges the banknotes through the banknote outlet 42*a*, thereby dispensing the banknotes.

The dispensing reject unit 43 accumulates banknotes that are not suitable to be dispensed, such as a banknote whose denomination cannot be recognized. For example, among the banknotes fed out from the banknote storage unit 47 during dispensing, a banknote, which could not be recognized by the banknote recognition unit 46 because of abnormal transport such as overlapping or skew, is transported to the dispensing reject unit 43. Meanwhile, among the banknotes taken from the banknote receiving unit 41, a banknote, which could not be recognized by the banknote recognition unit 46 because of stain or the like during depositing, is returned to the banknote dispensing unit 42 as a rejected banknote during the depositing.

A banknote cassette 60, which is used for collection of proceeds from sales and replenishment of change, is detachably mounted to the cassette mounting unit 44.

The plurality of banknote storage units 47 can be assigned to denominations of banknotes. Each banknote storage unit 47 stores therein banknotes of the assigned denomination, and can feed out the stored banknotes one by one.

The rotary transport unit 45 has a rotary transport path in the center thereof. A connecting transport path is disposed between the rotary transport path and each of the banknote receiving unit 41, the banknote dispensing unit 42, the dispensing reject unit 43, the cassette mounting unit 44, and each of the plurality of banknote storage units 47. The rotary transport path is provided with the banknote recognition unit 46 which recognizes the denomination, authenticity, fitness, face/back, transport state, etc., of each banknote.

The rotary transport unit 45 drives the rotary transport path to rotate in both the clockwise direction and the counterclockwise direction in FIG. 4 to transport banknotes one by one. Specifically, the rotary transport unit 45 drives the rotary transport path to rotate clockwise in FIG. 4 when storing banknotes in the banknote storage unit 47, and drives the rotary transport path to rotate counterclockwise in FIG. 4 when feeding out banknotes from the banknote storage unit 47. In addition to the rotation drive control, the rotary transport unit 45 controls the destination of banknotes by switching the banknote transport routes between the rotary transport path and the respective connecting transport paths.

Figure 5:
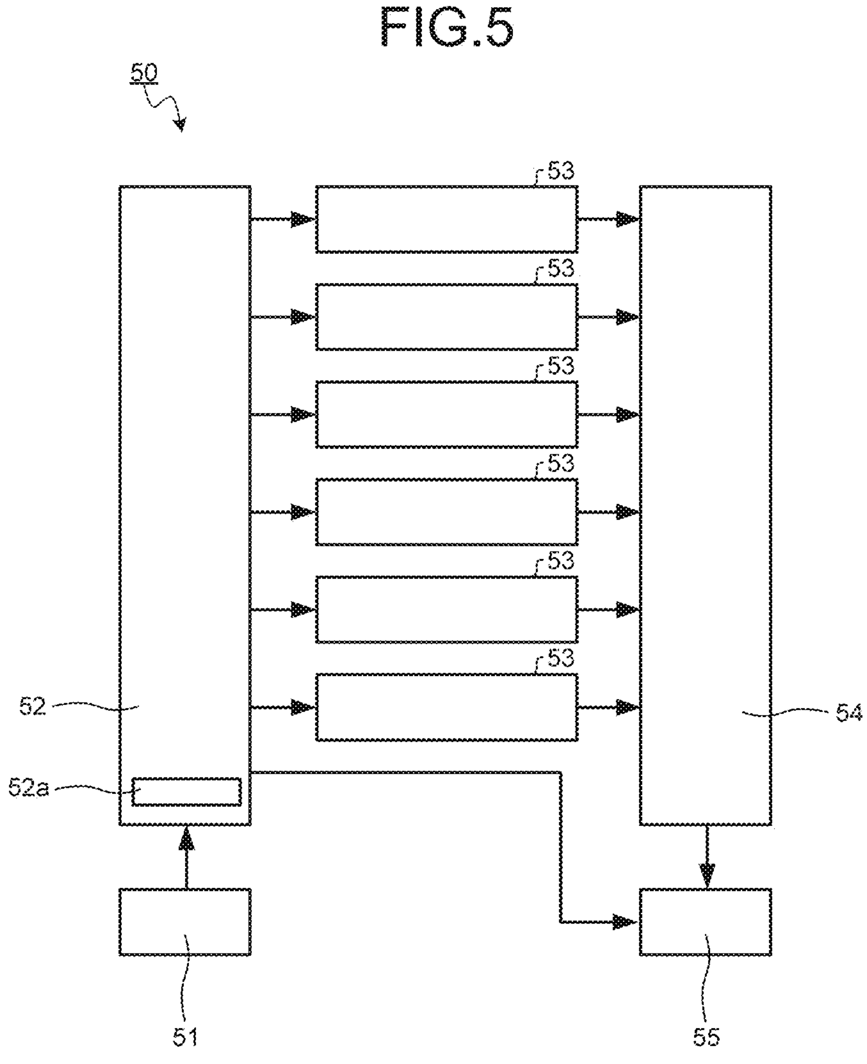
FIG. 5 illustrates a configuration of a coin handling unit.

FIG. 5 illustrates the configuration of the coin handling unit 50. As shown in FIG. 5, the coin handling unit 50 includes the coin inlet 51, the deposited coin transport unit 52, denomination-specific coin storage units 53, the dispensed coin transport unit 54, and the coin outlet 55. The deposited coin transport unit 52 is provided with a coin recognition unit 52*a*.

The deposited coin transport unit 52 takes coins inserted in the coin inlet 51, one by one, into the housing such that the coins are arranged in one layer in one line. Specifically, the deposited coin transport unit 52 is provided with a coin feeding mechanism including a feed belt or the like. When insertion of coins in the coin inlet 51 is detected, the coin feeding mechanism is driven and the coins are fed out one by one.

The coin recognition unit 52*a* recognizes the denomination, authenticity, fitness, face/back, transport state, etc., of each coin fed out to the deposited coin transport unit 52. The deposited coin transport unit 52 determines the destination of each coin, based on the recognition result of the coin recognition unit 52*a*. Coins not suitable to be stored in the coin storage unit 53, such as a stained coin and a coin not recognized as a genuine coin, are transported to the coin outlet 55 as rejected coins. Coins suitable to be stored in the coin storage unit 53 are transported to the coin storage units 53 corresponding to the denomination recognition results thereof.

The plurality of coin storage units 53 are assigned to denominations of coins. Each coin storage unit 53 stores therein coins of the assigned denomination, and can feed out the stored coins one by one to the dispensed coin transport unit 54. The dispensed coin transport unit 54 transports the coins fed out from the coin storage unit 53 and discharges the coins to the coin outlet 55.

<Description of Handling>

Next, a procedure of handling, in which the POS register 20 performs cash-out and charge, is described with reference to a flowchart shown in FIG. 6. FIG. 6 shows a case to receive two amounts, i.e., a cash-out amount and a charge amount.

Firstly, the amount designating information acquisition unit 26*d* receives an input of a cash-out amount (step S101) and receives an input of a charge amount (step S102), via the operation/display unit 21 or the like.

The amount-to-be-handled control unit 26*e* processes the total of the cash-out amount and the charge amount as the settlement amount. The amount-to-be-handled control unit 26*e* determines three amounts, i.e., a settlement amount, a cash-out amount, and a charge amount (step S103). Then, the amount-to-be-handled control unit 26*e* performs an in-machine inventory confirmation process of acquiring, from the change machine 30, information on the inventory amount of money stored in the change machine 30 (step S104). The amount-to-be-handled control unit 26*e* determines whether or not cash for the cash-out amount can be dispensed from the change machine 30 (step S105).

When the determination result indicates that cash for the cash-out amount cannot be dispensed (step S105: No), the amount-to-be-handled control unit 26*e* performs an in-machine inventory shortage notification process of notifying that the inventory amount is running short in the change machine 30 (step S106), and goes to step S101.

When cash for the cash-out amount can be dispensed (step S105: Yes), the amount-to-be-handled control unit 26*e* determines whether or not the IC card reader 23*a* has detected an IC card (step S107). When an IC card cannot be detected (step S107: No), the amount-to-be-handled control unit 26*e* performs notification for urging placement of an IC card (step S108), and goes to step S107.

When an IC card to be a charge destination has been detected (step S107: Yes), the amount-to-be-handled control unit 26*e* performs an approval reception process of displaying the dispensing amount and the charge amount, and receiving an approval operation of the customer (step S109). Upon receiving the approval operation, the amount-to-be-handled control unit 26*e* outputs the determined settlement amount to the settlement unit 26*c* to request settlement.

The settlement unit 26*c* performs an electronic settlement process based on the settlement amount determined by the amount-to-be-handled control unit 26*e* (step S110). When the electronic settlement process is appropriately completed, the amount-to-be-handled control unit 26*e* outputs the charge amount to the charge control unit 26*g*, and outputs the cash-out amount to the cash dispensing control unit 26*f*.

The charge control unit 26*g* controls the charge process. The charge control unit 26*g* charges electronic money for the charge amount to the IC card via the IC card reader 23*a* (step S111). The cash dispensing control unit 26*f* transmits, to the change machine 30, a dispensing instruction for the cash-out amount, and the change machine 30 performs a cash dispensing process (step S112), and ends the handling.

Figure 7:
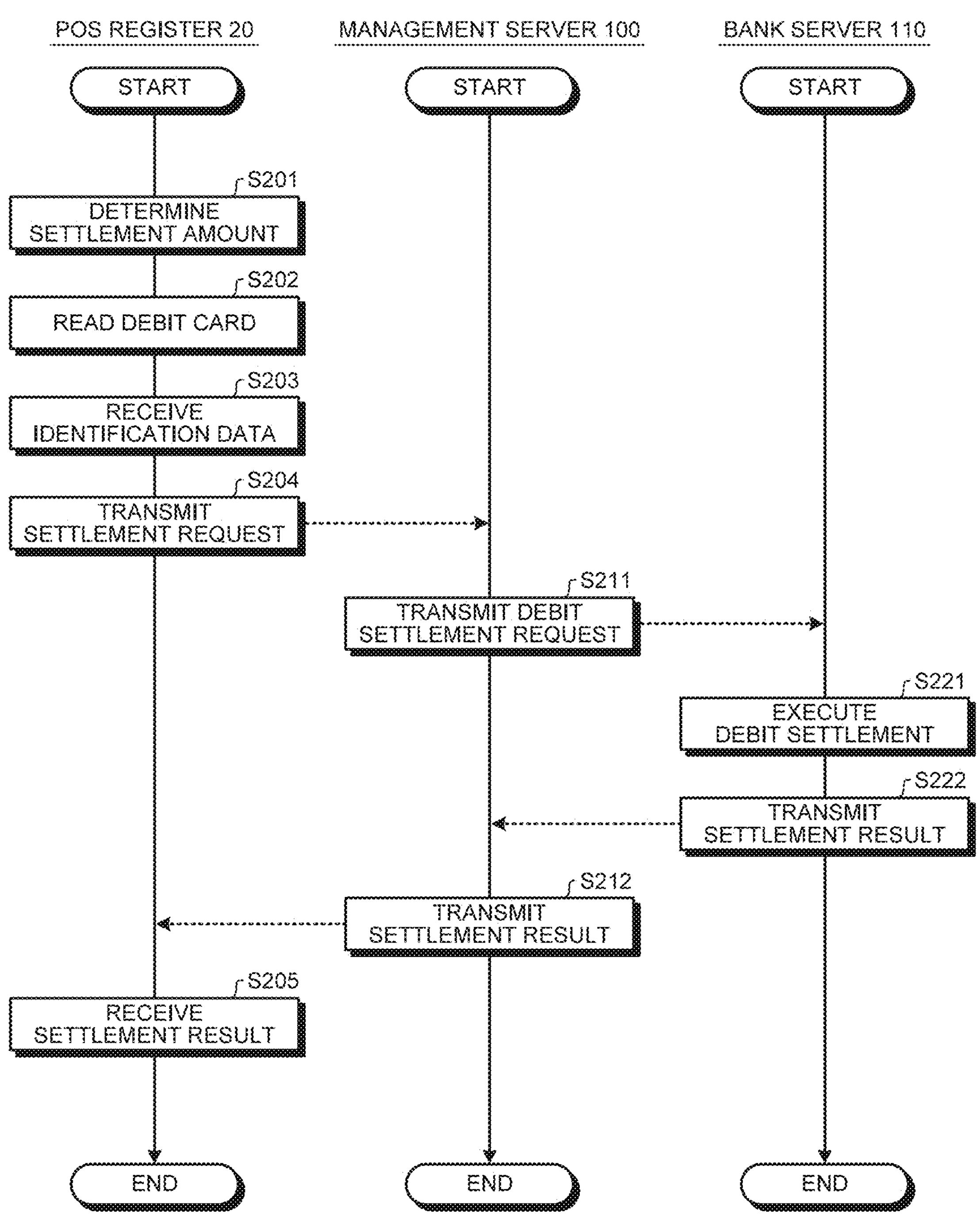
FIG. 7 illustrates a procedure of handling related to debit settlement.

Next, a procedure of handling, in which debit settlement is used for the electronic settlement process shown in FIG. 6, is described. FIG. 7 illustrates the procedure of handling for the debit settlement. Firstly, the amount-to-be-handled control unit 26*e* of the POS register 20 determines a settlement amount (step S201), and the settlement card reader 23*b* reads a debit card ID from a debit card (step S202). Meanwhile, identification data is received by the operation/display unit 21 or the like (step S203). Then, the settlement unit 26*c* transmits, to the management server 100, a settlement request including the settlement amount, the debit card ID, and the identification data (step S204).

Based on the settlement request received from the POS register 20, the management server 100 transmits a debit settlement request to a bank server 110 of a bank managing store members for the debit settlement (step S211). Upon receiving the debit settlement request, the bank server 110 performs debit settlement (step S221). In this debit settlement, the bank server 110 specifies an account from the debit card ID indicated in the debit settlement request, and performs authentication by using the identification data indicated in the debit settlement request. When the authentication has succeeded and the balance in the account is equal to or more than the settlement amount, the bank server 110 determines to permit settlement. When the authentication has failed or the balance in the account is less than the settlement amount, the bank server 110 determines not to permit settlement. The bank server 110 transmits the settlement result to the management server 100 (step S222).

The management server 100 transmits the settlement result received from the bank server 110, to the POS register 20 (step S212). The POS register 20 ends the handling upon receiving the settlement result from the management server 100 (step S205).

Next, a specific example of an input screen for receiving an input of a monetary amount is described with reference to FIG. 8. The input screen shown in FIG. 8 may be displayed on, for example, a touch panel display that is operable by a customer.

Figure 8:
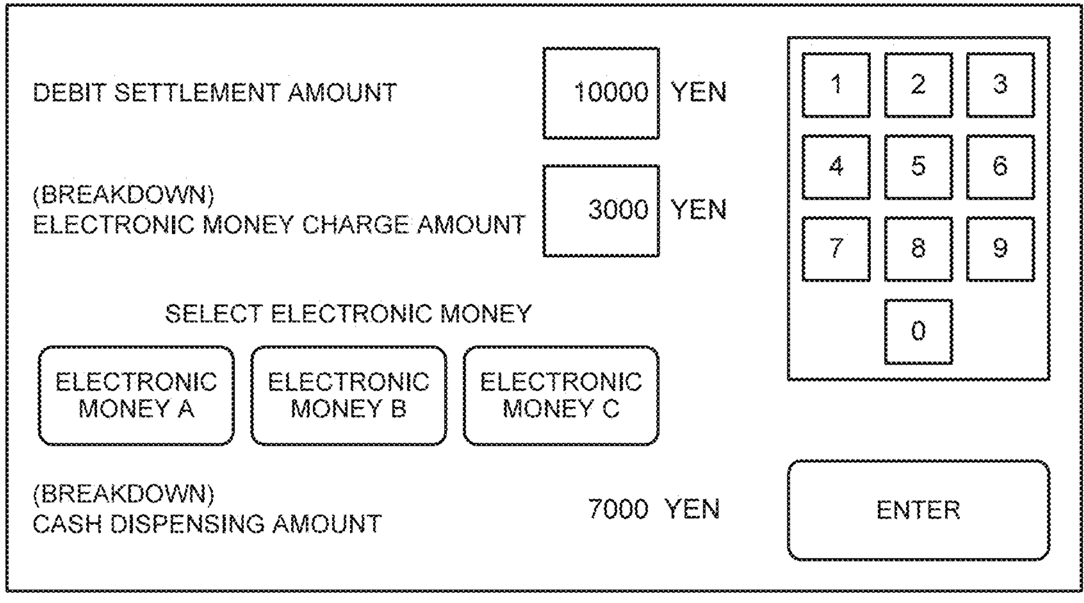
FIG. 8 illustrates a specific example of an input screen that receives input of a monetary amount.

In FIG. 8, input boxes are provided for a debit settlement amount and an electronic money charge amount, and a numeric keypad and an enter button allow input of arbitrary amounts into these boxes. In addition, electronic money as a charge destination is selectable from among a plurality of kinds (brands) of electronic money. FIG. 8 shows a state where "10,000" JPY is inputted in the input box for the debit settlement amount and "3,000" JPY is inputted in the input box for the electronic money charge amount. The charge destination is selectable from electronic money A, electronic money B, and electronic money C. In addition, a cash dispensing amount of "7,000" JPY calculated from the debit settlement amount of "10,000" JPY and the charge amount of "3,000" JPY is displayed on the screen.

FIG. 9 shows a specific example of an approval reception screen, on which a dispensing amount and a charge amount are displayed, for receiving an approval operation of a customer. The approval reception screen shown in FIG. 9 may be displayed on, for example, a touch panel display that is operable by the customer.

FIG. 9 shows the approval reception screen including: a message "Are you sure you want to charge 3,000-yen to electronic money B?" and two operation buttons of "Yes" and "No"; and a message "Are you sure you want to withdraw 7,000-yen by cash?" and two operation buttons of "Yes" and "No".

The approval reception screen shown in FIG. 9 is merely an example, and can be changed as appropriate. For example, the screen may be configured to display one of the charge confirmation message and the dispensing confirmation message. Alternatively, the screen may be configured to display both the charge confirmation message and the dispensing confirmation message and one set of operation buttons (one "Yes" and one "No"), so that the contents of charge and dispensing are determined by one approval operation.

FIG. 10 illustrates determination of monetary amounts by the amount-to-be-handled control unit 26*e*. When a settlement amount and a charge amount are acquired as a first amount and a second amount, respectively, the acquired settlement amount and charge amount are used as they are, and a cash-out amount is calculated by "settlement amount−charge amount". A fee may be added to the settlement amount.

When a charge amount and a cash-out amount are acquired as a first amount and a second amount, respectively, the acquired charge amount and cash-out amount are used as they are, and a settlement amount is calculated by "charge amount+cash-out amount". A fee may be added to the settlement amount.

When a settlement amount and a cash-out amount are acquired as a first amount and a second amount, respectively, the acquired settlement amount and cash-out amount are used as they are, and a charge amount is calculated by "settlement amount−cash-out amount". A fee may be added to the settlement amount.

As described above, according to the present embodiment, the cash handling system, which accepts electronic settlement and performs a process of dispensing cash, acquires a first amount as an amount regarding a first transaction and a second amount as an amount regarding a second transaction. Then, based on the first amount and the second amount, the cash handling system controls: electronic money as a negotiable value to be charged to an IC card via the IC card reader 23*a* serving as a charging unit; and an amount of cash to be dispensed via the change machine 30 serving as a dispensing unit.

Therefore, efficient operations can be achieved even when charge of electronic money is performed simultaneously with cash-out. Specifically, both dispensing of cash and charge of electronic money can be achieved by one electronic settlement, thereby reducing the labor of a customer. Furthermore, the labor of a clerk as an operator is also reduced. The reduction in the labor enables the clerk to quickly perform the two processes, which can reduce the number of customers waiting for checkout. The operator is not limited to a clerk. The same effects as described above can be achieved even when a customer operates the system by himself/herself.

As for the second amount, a negotiable value to be charged via the charging unit can be used, and a touch panel or the like may be provided as an input reception unit that receives an input of the second amount.

The cash handling system further includes an approval reception unit for receiving an approval operation with respect to at least one of a negotiable value to be charged to a storage medium, and an amount of cash to be dispensed from the dispensing unit. The cash handling system can charge a negotiable value to a storage medium via the charging unit and dispense cash via the dispensing unit, on the condition that an approval operation has been received via the approval reception unit. This configuration prevents occurrence of cash dispensing or charge for an amount that is not intended by a user. As for the approval reception unit, a touch panel or the like usable by a customer may be used.

In the cash handling system, the IC card reader 23*a* is used as a detection unit for detecting an IC card as a storage medium, and when an IC card has been detected, a negotiable value can be charged to the IC card. In a state where an IC card is not detected, notification control for performing predetermined notification process is possible.

Only one of cash-out and charge may be performed, although detailed description thereof is omitted in the present embodiment. Purchase of an item may be performed simultaneously with cash-out and/or charge. In this case, the cash handling system calculates a settlement amount so as to include a purchase amount (the price of an item purchased by a user), and performs electronic settlement.

In the present embodiment, the POS register 20 has a function as a debit terminal. However, a debit terminal may be externally connected to a POS register that does not have a function as a debit terminal.

In the present embodiment, when a fee is collected, settlement is performed with the fee being added to the designated amount. However, cash dispensing or charge may be performed with the fee being subtracted from the designated monetary amount. The change machine 30 may dispense cash corresponding to the amount from which the fee is subtracted. The POS register 20 may charge a medium possessed by a customer with the amount from which the fee is subtracted.

In the present embodiment, a clerk operates the POS register 20 and the change machine 30. However, the present disclosure may be applied to a configuration (so-called semi-self-checkout) in which a customer operates a change machine, and a configuration (so-called self-checkout) in which a customer operates the POS register 20 and the change machine.

In the present embodiment, a cash handling system installed in a store has been described as an example. However, the present disclosure may be applied to, for example, an automatic checkout machine installed in a golf course, a hospital, etc., and a ticket machine installed in a station, a restaurant, etc.

In the present embodiment, a debit card and an IC card are separated cards. However, the debit card and the IC card may be integrated to one card. Alternatively, a terminal device such as a smart phone can be used as a debit card and/or an IC card.

In the present embodiment, charge of electronic money has been described. However, instead of charge of electronic money, depositing of money to another account may be performed. In this case, a negotiable value is the balance in the account to which money is deposited, and a storage medium is a memory device in a financial institution to which money is deposited.

In the present embodiment, debit settlement has been mainly described as an example of electronic settlement. However, credit settlement using a credit card may be adopted.

The composition of denominations in cash-out may be changed according to the inventory amount. For example, when the amount of cash-out is an amount (e.g., 7,000-JPY) dispensable only by banknotes but the inventory amount of banknotes is running short (e.g., inventory amount of banknotes: 6,000-JPY), a part of the amount of cash-out may be dispensed by coins (e.g., coins equivalent to 1,000-JPY).

Figure 11:
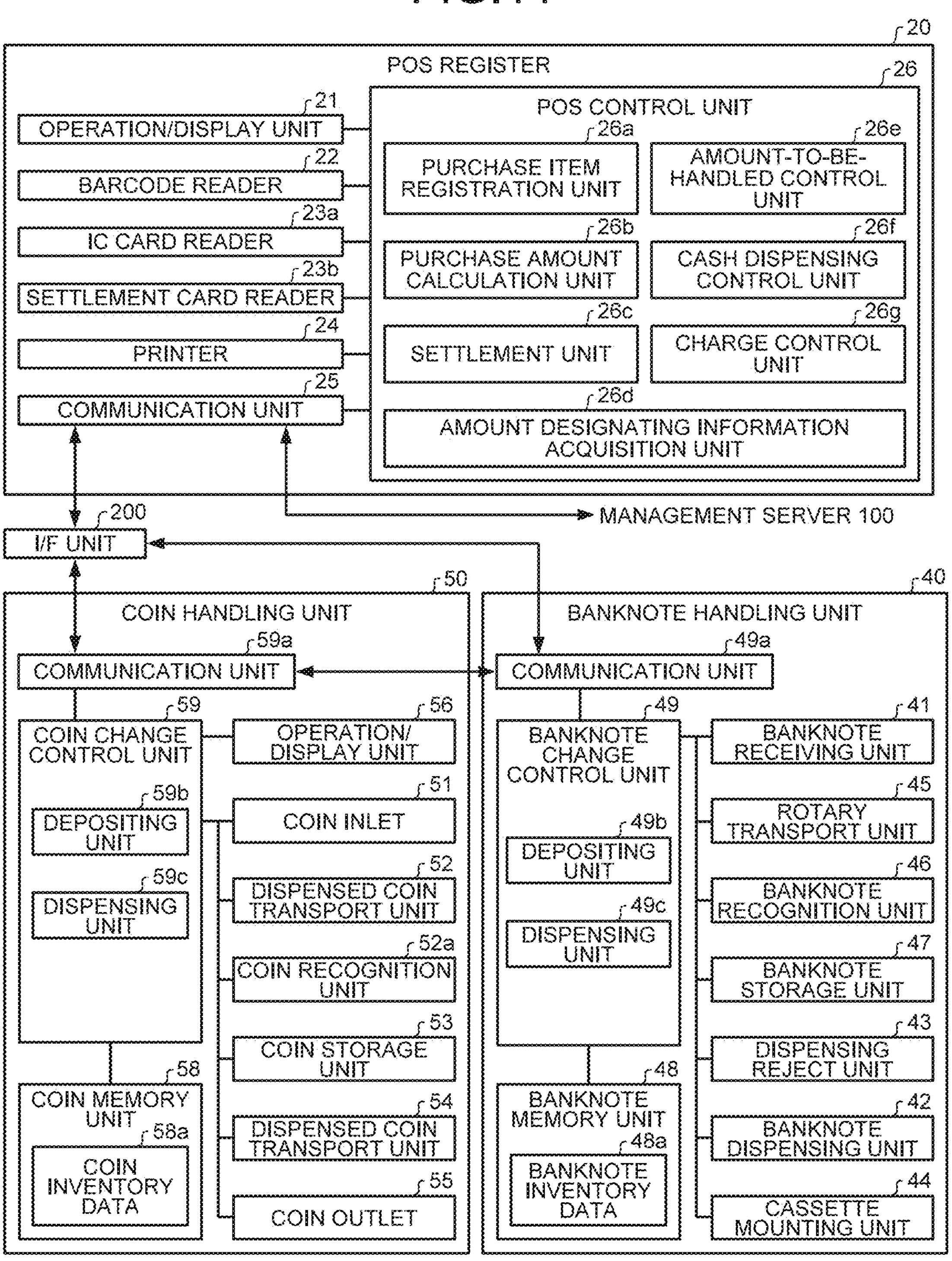
FIG. 11 is a functional block diagram showing an example in which a POS register and a change machine are connected to each other in a manner different from FIG. 3.

In the present embodiment, the banknote handling unit is connected to the POS register 20 via the coin handling unit 50. However, as shown in FIG. 11, the banknote handling unit 40 and the coin handling unit 50 may be connected to the POS register 20 via an I/F unit (interface unit) 200. The I/F unit 200 exchanges data between the POS register 20 and each of the banknote handling unit 40 and the coin handling unit 50, whereby the aforementioned operations of the POS register 20, the banknote handling unit 40, and the coin handling unit 50 can be realized.

In the present embodiment, the amount designating information acquisition unit 26*d* serves as an acquisition unit that acquires two pieces of amount information out of a settlement amount, a cash-out amount, and a charge amount. The charge amount is a transfer amount that is transferred from an account to electronic money. The amount-to-be-handled control unit 26*e* serves as a determination unit that determines three amounts, i.e., a settlement amount, a cash-out amount, and a charge amount, based on the acquired two amounts. The settlement unit 26*c* serves as a transmission unit that transmits information required for a process for an account, to the management server 100 as an external device that performs the process for the account. The IC card reader 23*a* serves as a charging unit that charges electronic money as a negotiable value to an IC card as a medium. The charge control unit 26*g* serves as a transfer unit that transfers a charge amount (transfer amount) to electronic money by using the IC card reader 23*a* as the charging unit, as described above for the charge process. An electronic money handling unit, which deals with, as electronic money, a part of monetary amount transferred from the account, is implemented by the functions of the acquisition unit, the determination unit, the transmission unit, and the transfer unit.

An electronic money charge process is a process of transferring a charge amount (transfer amount) from cash or an account to electronic money. This process is performed by charging electronic money for the charge amount to a medium such as an IC card, a smart phone, etc., as described above. Charge of electronic money is performed by storing information of the charge amount in the medium, for example. Alternatively, for example, charge of electronic money is performed by transmitting medium identification information and charge amount information to a predetermined data center that manages electronic money, and managing, in the data center, the charge amount information linked to the medium identification information. Still alternatively, for example, both the information storage for the charge amount by using the medium, and the information management for the medium and the charge amount in the data center may be performed.

Although dispensing of a part of a settlement amount by cash during electronic settlement is called "cash-out" in the present embodiment, the name of the process is not limited thereto. For example, dispensing of cash may be called "cash-back". The name of the process may be changed depending on a medium used for electronic settlement. For example, dispensing of cash by using a debit card may be called "cash-out" while dispensing of cash by using a credit card may be called "cash-back".

The constituent elements described in the above embodiment are conceptually functional constituent elements, and thus may not be necessarily configured as physical constituent elements, as illustrated in the drawings. That is, distributed or integrated forms of each device are not limited to the forms illustrated in the drawings, and all or some of the forms may be distributed or integrated functionally or physically in any unit depending on various loads, use statuses, or the like.

In the present embodiment, a cash handling system capable of dealing with electronic money, including: an electronic money handling unit configured to deal with, as electronic money, a part of money to be transferred to the electronic money, the money being withdrawn from an account; and a dispensing unit configured to dispense cash that is a part of the money.

In the above configuration, the electronic money handling unit includes: an acquisition unit configured to acquire any two amounts out of three amounts including a settlement amount to be withdrawn from the account, a transfer amount that is a part of the settlement amount and to be transferred to electronic money, and a cash-out amount that is a part of the settlement amount and to be dispensed by cash; a determination unit configured to determine, based on the two amounts acquired by the acquisition unit, three amounts that are the settlement amount, the transfer amount, and the cash-out amount; a transmission unit configured to transmit information including the settlement amount to an external apparatus that performs a process for the account; and a transfer unit configured to transfer the transfer amount to the electronic money.

In the above configuration, when a checkout process for an item that a customer purchases is to be performed, the determination unit determines the respective amounts such that a total amount of the transfer amount, the cash-out amount, and a price of the item becomes equal to the settlement amount.

In the above configuration, when a fee is to be collected, the determination unit determines the respective amounts such that the fee is included in the settlement amount.

The above configuration further includes an operation unit through which information is inputted, and the acquisition unit acquires information on the amounts via the operation unit.

The above configuration further includes a reading unit configured to read information, and the acquisition unit acquires information on the amounts via the reading unit.

The above configuration further includes an approval reception unit configured to receive an approval operation. The transfer unit transfers the transfer amount to the electronic money on a condition that the approval operation for the transfer amount has been performed on the approval reception unit.

The above configuration further includes an approval reception unit configured to receive an approval operation. The dispensing unit dispenses the cash for the cash-out amount on a condition that the approval operation for the cash-out amount has been performed on the approval reception unit.

The above configuration further includes a detection unit configured to detect a medium. When the detection unit has detected a medium, the transfer unit transfers the transfer amount so as to enable the electronic money to be used with the medium.

In the above configuration, when the detection unit cannot detect a medium, a notification process of notifying the same is performed.

In the above configuration, when the dispensing unit cannot dispense the cash for the cash-out amount, a notification process of notifying the same is performed.

In the above configuration, the transfer unit transfers the transfer amount so as to enable the electronic money to be used with a card or a terminal device.

In the above configuration, the cash handling system is configured to include a cash register, and a change machine used by the cash register.

In the present embodiment, a cash handling method to be performed in a cash handling system capable of dealing with electronic money, includes: dealing with, as electronic money, at least a part of money to be transferred to the electronic money, the money being withdrawn from an account; and dispensing cash that is at least a part of the money.

The cash handling system and the cash handling method according to the present disclosure are useful in realizing efficient operations.

The following description relates to a computer environment in which embodiments of the present disclosure may be implemented. This environment may include an embedded computer environment, local multi-processor embodiment, remote (e.g., cloud-based) environment, or a mixture of all the environments.

FIG. 12 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment. For example, the management server 100, bank server 110, store 10, POS register 20, change machine 30, banknote handling unit 40, coin handling unit 50 and their individual components may be configured to include various elements depicted in FIG. 12.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 12 is a functional block diagram illustrating a networked system 800 of one or more networked computers and servers. In an embodiment, the hardware and software environment illustrated in FIG. 12 may provide an exemplary platform for implementation of the software and/or methods according to the present disclosure.

Referring to FIG. 12, a networked system 800 may include, but is not limited to, computer 805, network 810, remote computer 815, web server 820, cloud storage server 825 and compute server 830. In some embodiments, multiple instances of one or more of the functional blocks illustrated in FIG. 12 may be employed.

Additional detail of computer 805 is shown in FIG. 12. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

What is claimed is:

1. A method, comprising:

receiving, via a barcode reader, item information on an item to be purchased by a customer;

determining, by processing circuitry and based on the item information, a purchase amount for the item;

obtaining, via a user interface, first information regarding a first amount to be withdrawn from an account of the customer, and second information regarding a second amount to be received as electronic money;

determining, by the processing circuitry and based on the first information and the second information, third information regarding a third amount to be dispensed in cash from the first amount;

performing, by the processing circuitry, an in-machine inventory confirmation process including:

acquiring, from a money handling apparatus, information on an inventory amount of money stored in the money handling apparatus; and determining, based on the information, that the money handling apparatus is able to dispense the third amount;

detecting, via a card reader, a medium of the customer;

performing, by the processing circuitry, an approval reception process including:

displaying a dispensing amount and a charge amount; and receiving an approval operation of the customer;

processing, by the processing circuitry, a transaction for the item by withdrawing the first amount from the account and adding the second amount of electronic money to the medium of the customer on a condition that the approval operation has been received and the money handling apparatus is able to dispense the third amount; and in response to the processing of the transaction, controlling, by the processing circuitry, the money handling apparatus to dispense cash which is a part of the third amount.

2. The method according to claim 1, wherein the determining the third amount includes calculating the third amount by subtracting the second amount from the first amount, and the method further comprises controlling the money handling apparatus to dispense the third amount of cash via the money handling apparatus.

3. The method according to claim 1, wherein the user interface is via a mobile terminal of the customer.

4. The method according to claim 1, wherein the first information and/or the second information is obtained from a graphical code provided by the customer.

5. The method according to claim 1, wherein the first information and/or the second information is obtained from a card of the customer.

6. The method according to claim 1, further comprising:

receiving payment cash from the customer; and controlling the money handling apparatus to dispense change to the customer in a case that a monetary amount received is greater than the purchase amount, wherein the monetary amount includes any of the payment cash, the first amount and the second amount.

7. The method according to claim 1, wherein the purchase amount is indicated by the second information, and the second amount is obtained by subtracting the purchase amount from the first amount.

8. The method according to claim 1, further comprising: performing a process for withdrawing the first amount from the account.

9. The method according to claim 1, further comprising: transmitting the first amount to an external apparatus configured to perform an account process, wherein the first amount is withdrawn from the account by the external apparatus.

10. The method according to claim 1, wherein the medium is a card or a terminal device of the customer.

11. The method according to claim 1, wherein the processing the transaction is performed with an automatic checkout machine.

12. The method according to claim 1, wherein the processing the transaction is performed with a ticket machine.

13. An apparatus, comprising:

a storage to store money;

a barcode reader configured to receive item information on an item to be purchased by a customer;

processing circuitry configured to determine, based on the item information, a purchase amount for the item;

obtain, via a user interface, first information regarding a first amount to be withdrawn from an account of the customer, and second information regarding a second amount to be received as electronic money;

determine, based on the first information and the second information, third information regarding a third amount to be dispensed in cash from the first amount; and perform an in-machine inventory confirmation process to:

acquire information on an inventory amount of money stored in the storage; and determine, based on the information, that the apparatus is able to dispense the third amount;

a card reader configured to detect a medium of the customer, wherein the processing circuitry is further configured to perform an approval reception process to:

display a dispensing amount and a charge amount; and receive an approval operation of the customer;

process a transaction for the item by withdrawing the first amount from the account and adding the second amount of electronic money to the medium of the customer on a condition that the approval operation has been received and the apparatus is able to dispense the third amount; and dispense, in response to processing the transaction, cash which is a part of the third amount.

14. The apparatus according to claim 13, wherein to determine the third amount, the processing circuitry is configured to calculate the third amount by subtracting the second amount from the first amount, and the processing circuitry is configured to control an outlet to dispense the third amount of cash.

15. A method for a money handling apparatus which obtains item information on an item to be purchased by a customer and calculates a purchase amount to be paid by the customer, the method comprising:

receiving, via a user interface by the money handling apparatus, any two pieces of information out of (i) first information regarding a first amount to be withdrawn from an account of the customer, (ii) second information regarding a second amount to be received by electronic money from the first amount, and (iii) third information regarding a third amount to be received in cash from the first amount;

determining, by processing circuitry and based on the received two pieces of information, the first amount, the second amount and the third amount;

performing, by the processing circuitry, an in-machine inventory confirmation process including:

acquiring information on an inventory amount of money stored in the money handling apparatus; and determining, based on the information, that the money handling apparatus is able to dispense the third amount;

detecting, via a card reader, a medium of the customer;

performing, by the processing circuitry, an approval reception process including:

displaying a dispensing amount and a charge amount; and receiving an approval operation of the customer;

processing, by the processing circuitry, a transaction for the item by withdrawing the first amount from the account and adding the second amount of electronic money to the medium of the customer on a condition that the approval operation has been received and the money handling apparatus is able to dispense the third amount; and dispensing, via an outlet of the money handling apparatus in response to the processing the transaction, cash which is a part of the third amount.

16. The method according to claim 15, wherein in a case that the first information and the second information are received from the customer:

the third amount is determined by subtracting the second amount from the first amount, and the third amount of cash is dispensed from the money handling apparatus.

* * * * *